Figure 1:
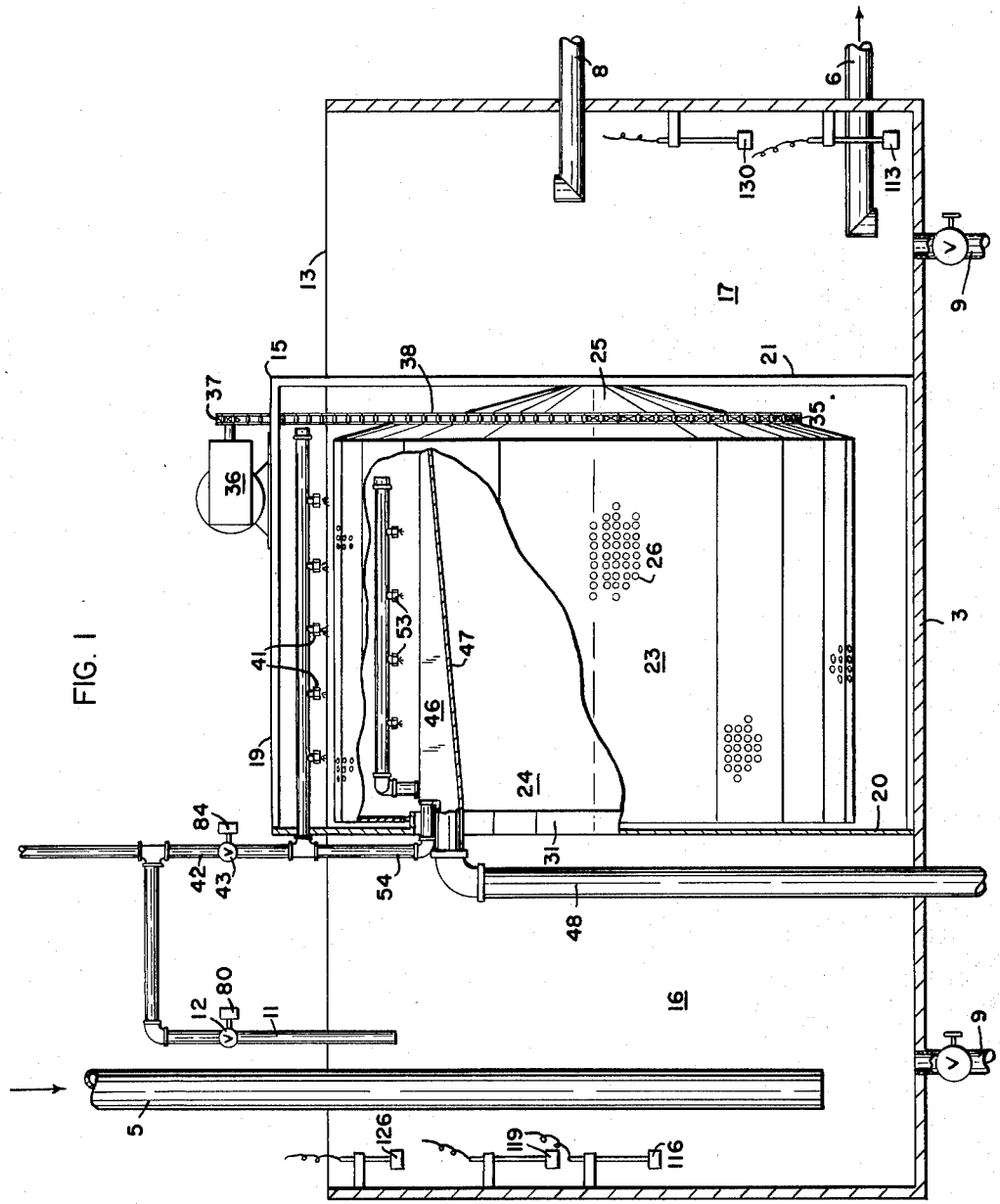

Nov. 16, 1965     H. A. OGLETREE     3,217,882
FILTER CONTROL SYSTEM AND METHOD
Filed Dec. 13, 1962     2 Sheets-Sheet 2

INVENTOR.
HAROLD A. OGLETREE.
BY
ATTORNEY.

United States Patent Office 3,217,882
Patented Nov. 16, 1965

3,217,882
FILTER CONTROL SYSTEM AND METHOD
Harold A. Ogletree, Stone Mountain, Ga., assignor to Carrier Corporation, Syracuse, N.Y., a corporation of Delaware
Filed Dec. 13, 1962, Ser. No. 244,514
17 Claims. (Cl. 210—77)

This invention relates to apparatus and method for filtering a liquid, and more particularly to a control arrangement for filtering apparatus.

Air conditioning systems of the type adapted to effect evaporative cooling and humidification or dehumidification of air may include one or more spray type air conditioning units. In a spray type unit, a stream of untreated air passing through the unit is subjected to a finely divided liquid spray, normally water, which in addition to changing the condition of the air removes dirt, lint and other air-borne foreign matter from the air. The sprayed liquid may be thereafter passed through a filtering apparatus effective to remove dirt, lint and other foreign matter from the liquid prior to return of the liquid to the spray unit or units.

The filtering apparatus may, during use, become clogged with accumulated dirt, lint and other foreign matter removed from the liquid flowing therethrough with resultant inefficient operation and ultimate interruption of liquid flow to the spray unit or units. To insure continued efficient operation of the filtering apparatus, the filtering apparatus may be provided with a cleaning means effective to remove accumulated dirt, lint and other foreign matter from the filter.

It is understood that that portion of the system liquid used to humidify the air is lost to the system. Other system liquid losses may be contemplated, for example, losses occasioned through leakage from the system. In order to maintain an operating amount of liquid in the system, a liquid replenishing device may be provided.

It is a principal object of the present invention to provide a unique control arrangement for a liquid replenishing and filter cleaning apparatus in a system having a filter operable to insure sufficient filtered liquid for system operation.

It is an additional object of this invention to provide in a liquid system having a filter a control for a liquid replenishing and filter cleaning apparatus operative in response to determined system liquid conditions to replenish liquid lost to the system and to clean the system filter.

It is a further object of this invention to provide a novel control arrangement operable in response to contamination of a liquid filtering apparatus to clean the filtering apparatus.

It is a further object of this invention to provide a control arrangement for the liquid replenishing means of a system operable in response to a predetermined loss of liquid from the system to activate the liquid replenishing means to add liquid to the system.

It is an additional object of this invention to provide a novel method for operating a liquid replenishing and filter cleaning apparatus in a system having a filter to maintain a predetermined amount of filtered liquid in the system. These and other objects will be apparent from the ensuing description.

This invention relates to a liquid filtering system including a liquid receptacle having first and second sections, a rotatable member disposed between the sections having a perforate peripheral surface, a portion of the rotatable member perforate surface communicating the receptacle first section with the second section, means for introducing contaminated liquid in the first section, means for introducing make-up liquid in the first section, means for removing filtered liquid from the second section, cleaning means for removing foreign material from the rotatable member perforate surface, the cleaning means including a drive means for rotating the member and nozzle means spaced from the member perforate surface and adapted to discharge liquid at the perforate surface to dislodge foreign matter therefrom, and control means to selectively energize the cleaning means and the make-up means including liquid level responsive actuating means in each of the first and second receptacle sections.

This invention additionally relates to a method of operating a liquid filtering system including a sump having inlet and outlet compartments and a filter communicating the inlet compartment with the outlet compartment, in which the steps consist in cleaning the filter in response to a decrease in liquid level in the outlet compartment below a predetermined level, continuing the filter cleaning for at least a predetermined time interval, adding liquid to the system in response to a first predetermined liquid level in the inlet compartment, terminating filter cleaning at the end of the timed interval upon an increase in liquid level in the outlet compartment above the predetermined level, and terminating the addition of liquid to the system in response to a second predetermined liquid level in the inlet compartment.

Figure 2:
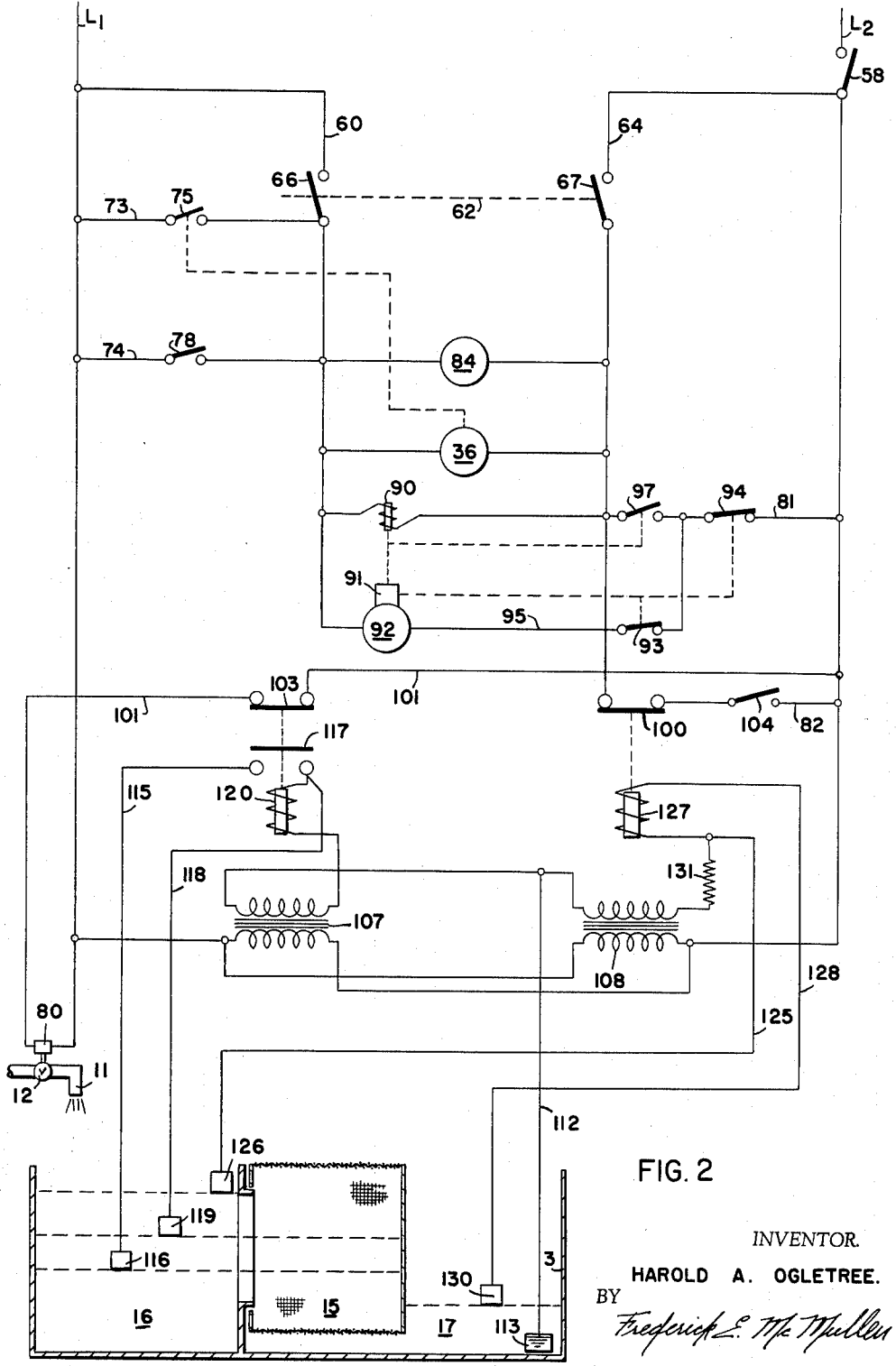

The attached drawings illustrate a preferred embodiment of the present invention, in which:

FIGURE 1 is a side elevation, partly in section, of the liquid filtering apparatus and filter cleaning means of the present invention; and FIGURE 2 is a schematic diagram of the electrical circuit employed with the controls of the present invention.

Referring to FIGURE 1 of the drawings, a liquid receptacle or sump designated generally by the numeral 3 is shown. Sump 3 includes intake and discharge lines 5 and 6 respectively which may be part of the liquid circulation circuit for a spray type air conditioning system. In that type of system, a suitable pump (not shown) withdraws liquid, usually water, from the sump 3 by means of line 6, the liquid passing to the system air conditioning unit. Therein, the liquid is converted to a finely divided spray and directed at untreated air passing through the unit. The spray cools, humidifies or dehumidifies and cleans the air of dirt, lint and other airborne foreign matter. The treated air is thereafter passed through an eliminator adapted to remove entrained liquid therefrom prior to the passage of the treated air into the area to be conditioned. The sprayed liquid, now contaminated with dirt, lint and other foreign matter removed from the air, and the liquid removed by the eliminator are returned to the tank 3 by means of the line 5.

Recirculation of the return liquid in its contaminated state to the air conditioning unit is undesirable. To purge the return liquid of foreign material prior to the recirculation thereof to the air conditioning unit, the liquid may be passed through a filter apparatus 15. The filter apparatus 15, positioned in the liquid circulation circuit of the system so that all liquid passes therethrough prior to passage thereof to the air conditioning unit, is adapted to trap and thus remove liquid-borne foreign matter.

To limit the amount of liquid in tank 3, overflow line 8 is provided. Tank 3 may be provided with one or more drains 9, selectively operable to drain the tank when, for example, cleaning of the tank is required.

Since that portion of the liquid used to humidify the air is lost to the system and since liquid losses may occur throughout the system, as for example, through leaks, a make-up line 11 communicating the tank 3 with a source of liquid supply may be provided. The make-up line 11 includes a solenoid controlled valve 12 adapted to regulate the flow of make-up liquid to tank 3.

Filter assembly 15 is positioned in tank 3 to separate the tank into return compartment 16 and outlet compartment 17. The filter assembly 15 includes a frame 19 having opposite ends 20, 21 spanning the width of the tank and abutting the opposite side walls 13 thereof.

A filter drum 23 is mounted for rotation on the frame 19 by suitable bearing means (not shown). One end 24 of drum 23 is open and the opposite end 25 thereof is closed. A plurality of perforations 26 are provided in the cylindrical surface of the drum. The end 20 of frame 19 comprises a wall having an opening 31 communicating compartment 16 of the tank with open end 24 of the drum 23. By this construction, liquid flowing from compartment 16 toward compartment 17 is forced to pass through drum perforations 26 which serve to trap foreign material in the liquid.

Foreign material trapped within the filter drum 23 may interfere with the free flow of liquid through perforations 26. Restriction or blockage of liquid flow may result in abnormal liquid levels in compartments 16 and 17, and inefficient operation of the filter. In order to prevent restriction or blockage of liquid flow from compartment 16 to compartment 17 the filter assembly includes a cleaning apparatus operative to remove accumulated dirt, lint and other foreign matter from the filter drum.

Referring to FIGURE 1 of the drawing, filter drum 23 is provided with a gear 35 coaxial therewith. An electric motor 36 having a drive gear 37 is fixedly attached to frame 19. A chain drive 38 connects gear 37 to gear 35. By this construction, energization of motor 36 effects rotation of filter drum 23.

A plurality of spaced nozzles 41 are fixedly attached to frame 19. Nozzles 41 are spaced from and directed at the exterior surface of perforated drum 23. A line 42 including solenoid operated regulating valve 43 adapted to communicate nozzles 41 with a source of liquid supply is provided. Nozzles 41, upon actuation of valve 43, impinge liquid against the exterior perforated surface of the filter drum 23.

A sludge pan 46, fixedly attached to filter assembly frame 19 by suitable means (not shown), is positioned within the filter drum 23. Base 47 of pan 46 slopes downwardly throughout its length, the lowermost portion thereof communicating with a sludge drain line 48. Foreign matter removed from the inside surface of drum 23 by liquid emitted from nozzles 41 falls into pan 46 and thereafter passes into sludge drain line 48. To insure movement of sludge in pan 46 into drain 48, a second set of spaced nozzles 53, located above and directed at pan 46 may be provided. Line 54 communicates nozzles 53 with liquid line 42. It is appreciated that valve 43 regulates the admission of liquid into line 54.

In operation, return liquid from the air conditioning unit entering compartment 16 through line 5 passes through opening 31 into the filter drum 23 and through the perforations 26 into compartment 17. The filtered liquid thereafter returns through line 6 to the air conditioning unit. Dirt, lint and other foreign matter borne by the return liquid is trapped within the drum 23. Upon the accumulation of foreign matter within drum 23, motor 36 may be energized to rotate the drum. At the same time, valve 43, regulating nozzles 41 and 53, may be opened to admit liquid to the nozzles. As the outer surface of the drum 23 rotates past nozzles 41, liquid emitted therefrom frees accumulated foreign matter from the inner surface of the drum. The removed foreign matter falls into sludge pan 46 wherein liquid directed at the sludge pan by nozzles 53 carries the foreign matter into drain line 48. It is noted that during the cleaning process, which may require several revolutions of drum 23, a portion of the drum is at all times in the air conditioning system liquid circulation circuit. Filtering of the liquid passing from compartment 16 to compartment 17 is uninterrupted by the drum cleaning process. In the event of loss of liquid from the system, valve 12 may be opened to admit liquid to make-up line 11 communicating with compartment 17 of tank 3.

To initiate operation of the filter cleaning apparatus and/or to add make-up liquid to the system as required and to maintain operation thereof for the period of time necessary to effectuate cleaning of the filter and/or addition of sufficient make-up liquid to replenish that lost, a control arrangement, shown particularly in FIGURE 2 of the drawing, is provided. In that arrangement L1 and L2 designate the main lines of source of electric current. Line L1 includes a manually controlled "on-off" switch 58 by means of which the unit may be shut down when desired.

Lines L1 and L2 supply power to a first circuit comprising leads 60, 64. The first circuit includes a switch 62 having a pair of normally open switch arms 66, 67 across leads 60, 64 respectively. In a manner to be more fully explained hereinafter, switch 62 is adapted, when manually actuated, to complete the first circuit.

A pair of leads 73, 74 connect between line L1 and lead 60. Lead 73 includes a normally open switch 75 closed upon energization of the strainer drive motor 36. Lead 74 includes a normally open switch 78 closed upon energization of the system liquid circulating pump. In parallel across the first circuit leads 60, 64 are the spray valve solenoid 84; filted drive motor 36; and timer clutch and switch control solenoid 90. A pair of leads 81, 82 connect between lead 64 and line L2. Lead 81 includes a normally open switch 97 and a normally closed timing switch 94. A lead 95 connects lead 60 to lead 81 between switches 97 and 94. Lead 95 includes timing motor 92 and normally open timing switch 93. Lead 82 includes a normally closed control switch 100 and a normally open switch 104 closed upon energization of the system liquid circulating pump.

It is noted that energization of solenoid 90 engages timing motor clutch 91 to couple an output control shaft (not shown) to timing motor 92. The timing motor output control shaft is provided with a suitable means, for example, cams, adapted to open normally closed timing switches 93, 94 after a predetermined time. Deenergization of solenoid 90 disengages clutch 91 and closes timing switches 93, 94. Solenoid 90 additionally controls switch 97, energization of solenoid 90 closing the normally open switch 97.

A second circuit comprising lead 101 is connected between lines L1 and L2. Lead 101 includes make-up liquid regulating valve solenoid 80 and a normally closed control switch 103.

A third circuit having a pair of step-up transformers 107, 108 is connected between lines L1 and L2. Transformer 107 supplies power to a pair of secondary circuits comprising leads 115, 118 having a common ground lead 112. Lead 115 includes contact probe 116, normally open switch 117 and switch solenoid 120. Lead 118 includes contact probe 119 and switch solenoid 120. Switch solenoid 120 controls switches 103 and 117, energization thereof opening normally closed control switch 103 and closing normally open switch 117.

Transformer 108 supplies power to a pair of secondary circuits comprising leads 125, 128 connected to common ground lead 112. Lead 125 includes contact probe 126 and resistance 131. Lead 128 includes contact probe 130, switch solenoid 127 and resistance 131. Switch solenoid 127 controls switch 100, energization thereof opening normally closed control switch 100. Ground lead 112 includes a contact probe 113.

Contact probes 116, 119 and 126 are fixedly positioned at predetermined levels in compartment 16 of tank 3. Contact probes 113 and 130 are similarly positioned in compartment 17. It is appreciated that ground probe 113 may be positioned at any portion of the tank 3 desired so as to be in uninterrupted contact with the liquid therein. Probes 113, 116, 119, 126 and 130 may be made from any suitable material as, for example, stainless steel.

*Operation*

In describing the operation of applicant's control arrangement manually operated "on-off" switch 58 is assumed closed. It is further assumed that the air conditioning system liquid pump is energized and therefore switches 78 and 104 are, in response to the operation of the system pump, closed.

Liquid in compartment 16 in contact with probe 119 establishes a circuit through lead 118 and ground lead 112 to energize switch solenoid 120. Energization of solenoid 120 closes switch 117 and opens control switch 103. Closure of switch 117 establishes a holding circuit through lead 115, switch 117 and ground lead 112. Opening of control switch 103 interrupts the circuit through lead 101 to deenergize make-up valve solenoid 80. Make-up valve 12 is accordingly closed. Should the liquid level in compartment 16 fall below probe 119 but remain in contact with probe 116, the holding circuit comprising lead 115, switch 117 and ground lead 112 maintains switch solenoid 120 energized. Make-up valve 12 accordingly remains closed.

A drop in liquid level below contact probe 116 interrupts the holding circuit to deenergize switch solenoid 120. Deenergization of solenoid 120 opens switch 117 and closes control switch 103. Closure of switch 103 completes the circuit through lead 101 to energize make-up valve solenoid 80. Energization of solenoid 80 opens regulating valve 12 to admit make-up liquid to compartment 16 by means of line 11.

A rise in liquid level in compartment 16 into contact with probe 119 completes the circuit through lead 118 and ground lead 112 to energize switch solenoid 120 to open control switch 103 and close switch 117. As noted heretofore, opening of switch 103 deenergizes make-up valve solenoid 80 to close the make-up valve 12 and stop the flow of make-up liquid into compartment 16 through line 11.

Probe 126 in compartment 16 of tank 3 and probe 130 in compartment 17 of tank 3 control the filter cleaning apparatus. Control by probe 126 and probe 130 is exercised through control switch 100 to automatically initiate, and in some instances terminate, operation of the cleaning apparatus. Since probe 126 and probe 130 exercise control through a common element, that is, control switch 100, the relationship of probes 126 and 130 to switch 100 will first be described and thereafter the relationship of switch 100 to the cleaning apparatus control circuitry.

A drop in liquid level in compartment 17 below probe 130 interrupts the circuit comprising lead 128, resistance 131 and ground lead 112 to deenergize switch solenoid 127. Deenergization of solenoid 127 permits control switch 100 to close, initiating operation of the filter cleaning apparatus in a manner to be more fully explained hereinafter. A subsequent rise in liquid level in compartment 17 into contact with probe 130 completes the above noted circuit to energize switch solenoid 127. Energization of solenoid 127 opens control switch 100.

Referring to compartment 16, a rise in liquid level therein into contact with probe 126 completes the circuit comprising lead 125, resistance 131 and ground lead 112. Completion of this circuit shorts out switch solenoid 127 to deenergize solenoid 127. Control switch 100, held open by solenoid 127, closes to initiate operation of the filter cleaning apparatus. A subsequent drop in liquid level in compartment 16 below probe 126 interrupts the last mentioned circuit to energize switch solenoid 127. Energization of solenoid 127 opens control switch 100.

Closure of control switch 100 through deenergization of switch solenoid 127 due either to the liquid level falling below probe 130 or liquid contacting probe 126 completes the circuit from line L1 through lead 74, switch 78, leads 60, 64, control switch 100, lead 82 and switch 104 to line L1 to energize the liquid spray valve solenoid 84, filter drive motor 36 and the timer clutch and switch solenoid 90. Energization of solenoid 84 opens regulating valve 43 to admit liquid to spray nozzles 41 and 53 by means of lines 42 and 54 respectively. Energization of filter drive motor 36 effects rotation of the filter drum 23, and closure of normally open switch 75. Energization of the timer clutch and switch solenoid 90 closes switch 97 and effects engagement of clutch 91 to commence the preset timed cycle.

At the expiration of the timed cycle, timing switches 93, 94 are opened by the timing motor driven control shaft. Opening of switch 93 deenergizes the timing motor 92. If control switch 100 is open (due to a fall in liquid level in compartment 16 away from probe 126 or a rise in liquid level in compartment 17 into contact with probe 130) opening of the timing switch 94 deenergizes the liquid spray valve solenoid 84, filter drive motor 36 and timer clutch and switch solenoid 90. Deenergization of solenoid 84 permits regulating valve 43 to close, interrupting flow of liquid to nozzles 41 and 53. Deenergization of motor 36 stops the rotation of the filter drum 23. Deenergization of solenoid 90 opens switch 97 and releases clutch 91 to disengage the timing motor 92 from the switch control shaft. It is noted that disengagement of clutch 91 closes timing switches 93, 94.

If, at the termination of the timed cycle, control switch 100 remains closed (due to liquid in compartment 16 contacting probe 126 or a liquid level in compartment 17 below probe 130), the liquid spray valve solenoid 84, filter drive motor 36 and the timer clutch and switch solenoid 90 remain energized through the circuit comprising line L1, lead 74, switch 78, leads 60, 64, lead 82, control switch 100, and switch 104 to line L2. The filter cleaning apparatus accordingly continues to function uninterruptedly. It is noted that opening of timing switch 93 interrupts the circuit to the timing motor 92. However, since solenoid 90 remains energized, clutch 91 coupling timing motor 92 to the switch control shaft remains engaged. Timing switches 93, 94 remain open until release of clutch 91. At this point, the filter cleaning apparatus operates under the control of switch 100 until such time as switch solenoid 127 is energized to open switch 100. As noted heretofore, solenoid 127 is energized to open switch 100 upon a fall in liquid level in compartment 16 away from probe 126 or a rise in liquid level in compartment 17 into contact with probe 130.

To initiate operation of the filter cleaning apparatus irrespective of the liquid level in either of the compartments 16 and 17, manually actuated switch 62 may be momentarily depressed. Closure of switch 62 completes the circuit from line L1 through lead 60, switch arm 66, lead 64 and switch arm 67 to line L2 to energize the liquid spray valve solenoid 84, filter drive motor 36 and the timer clutch and switch solenoid 90. Energization of solenoid 84 and motor 36 initiate operation of the filter cleaning apparatus in the manner noted heretofore. Energization of solenoid 90 commences the timed cycle through engagement of the timer motor clutch 91 and the closure of switch 97. Closure of switch 97 establishes a holding circuit from line L1 through lead 74, switch 78, leads 60, 64, switch 97, lead 81 and timing switch 94 to line L2 permitting release of manually actuated switch 62. This holding circuit is controlled by timing switch 94 which is opened at the termination of the timed cycle to interrupt the holding circuit to deenergize liquid spray valve solenoid 84, filter drive motor 36, and timer clutch and switch solenoid 90 to terminate operation of the filter cleaning apparatus.

It is appreciated that both the filter cleaning apparatus and the liquid make-up apparatus may operate simultaneously. For example, a liquid level in compartment 17 below probe 130 initiates operation of the filter cleaning apparatus for at least the timed interval as described heretofore. Should liquid level in compartment 16 be below probe 116 during this cycle, the make-up apparatus would accordingly be actuated to add make-up liquid to the system.

While I have described a preferred embodiment of my invention, it will be understood that the invention is not limited thereto, since it may be otherwise embodied within the scope of the following claims.

I claim:

1. In a liquid filtering system including a sump having inlet and outlet compartments with a filter having self-cleaning means including filter moving means and washing means communicating said inlet compartment with said outlet compartment, and liquid make-up means for adding liquid to the system, a control arrangement comprising
   (a) circuit means for actuating said filter cleaning means;
   (b) circuit means for actuating said liquid make-up means; and
   (c) control circuit means operable to selectively energize said cleaning circuit means and said make-up circuit means in response to predetermined liquid levels in the filtering system, said cleaning circuit means including a control switch regulating energization of said cleaning circuit means, said control circuit means including means separately responsive to predetermined liquid levels in both said inlet and outlet compartments for actuating said control switch to actuate said filter cleaning means.

2. In the liquid filtering system as recited in claim 1, said cleaning circuit means including
   (a) a first circuit for actuating said filter moving means,
   (b) a second circuit for actuating said filter washing means,
   (c) third circuit means adapted to energize said first and second circuits, said third circuit means including timing means operable to interrupt said third circuit means after a preset time interval, and
   (d) fourth circuit means including said control switch adapted to energize said first and second circuits and said third circuit means.

3. In the liquid filtering system as recited in claim 1,
   (a) said make-up means including a switch regulating energization of said make-up circuit means, and
   (b) said control circuit means including means responsive to predetermined liquid levels in said inlet compartment for actuating said make-up switch to actuate said make-up means.

4. In the liquid filtering system as recited in claim 3, said means for actuating said control switch including
   (a) a first relay,
   (b) a first relay circuit energizable in response to a predetermined liquid level in said outlet compartment, and
   (c) means to deenergize said first relay circuit including a circuit energizable in response to a first predetermined liquid level in said inlet compartment.

5. In the liquid filtering system as recited in claim 4, said means for actuating said make-up switch including
   (a) a second relay,
   (b) second relay circuit means operable in response to a second predetermined liquid level in said inlet compartment to energize said second relay, said second relay circuit means deenergizing said second relay in response to a third predetermined liquid level in said inlet compartment.

6. In the liquid filtering system as recited in claim 5, said second relay circuit means including a pair of circuits energizable in response to said second predetermined liquid level, one of said circuits being deenergized in response to a decrease in liquid level in said inlet compartment below said second predetermined liquid level.

7. In a liquid filtering system including a filter having an inlet and outlet, liquid make-up means for adding liquid to the system, and means operable to clean said filter, a control arrangement comprising
   (a) circuit means for actuating said cleaning means;
   (b) means including first and second circuits for energizing said circuit means;
   (c) said first and second circuits being normally open;
   (d) said first circuit including means operable in response to closure of said first circuit to interrupt said first circuit after a preset time interval;
   (e) means operable in response to predetermined liquid levels in said system for closing said first and second circuits;
   (f) said last mentioned means including a third circuit energizable in response to a predetermined liquid level at said filter outlet;
   (g) a fourth circuit energizable in response to a predetermined liquid level at filter inlet; and
   (h) a second circuit means for actuating said liquid make-up means in response to system demand.

8. In a liquid filtering system including a sump having inlet and outlet compartments with a filter having filter moving and washing means communicating said inlet compartment with said outlet compartment, and liquid make-up means for replenishing liquid lost to the system, a control arrangement comprising
   (a) a first circuit for actuating said filter moving means;
   (b) a second circuit for actuating said filter washing means;
   (c) third circuit means adapted to energize said first and second circuits, said third circuit means including a timing mechanism adapted to interrupt said third circuit means after a preset time interval;
   (d) fourth circuit means operable to energize said first and second circuits, and said third circuit means;
   (e) a switch controlling energization of said fourth circuit means;
   (f) control means for said switch including switch actuating means energizable in response to predetermined liquid levels in said inlet and outlet compartments respectively; and
   (g) fifth circuit means for actuating said liquid make-up means in response to liquid level conditions in said inlet compartment.

9. In the liquid filtering system as recited in claim 8, said switch actuating means including a relay, and a first relay circuit for energizing said relay in response to a predetermined liquid level in said outlet compartment.

10. In the liquid filtering system as recited in claim 9, said switch actuating means including a second relay circuit operable to deenergize said relay in response to a predetermined liquid level in said inlet compartment.

11. In a liquid filtering system including a sump having inlet and outlet compartments with a filter including filter moving and washing means, said filter communicating said inlet compartment with said outlet compartment, and a liquid make-up means adapted to communicate said inlet compartment with a source of liquid supply, a control arrangement comprising
   (a) a first circuit for actuating said filter moving means;
   (b) a second circuit for actuating said filter washing means;
   (c) third circuit means adapted when completed to energize said first and second circuits, said third circuit means including a timing mechanism operable to interrupt said third circuit means after a preset time interval;
   (d) fourth circuit means adapted when completed to energize said first and second circuit means and to complete said third circuit means, said fourth circuit means including a control switch adapted when closed to complete said fourth circuit means;
   (e) fifth circuit means adapted when completed to energize said liquid make-up means, said fifth circuit means including a control switch adapted when closed to complete said fifth circuit means; and
(f) means for actuating said control switch including:
(1) a first relay for said fourth circuit means control switch,
(2) a second relay for said fifth circuit means control switch,
(3) sixth circuit means for energizing said first relay in response to a predetermined liquid level in said outlet compartment,
(4) means for deenergizing said sixth circuit means including a seventh circuit energizable in response to a predetermined first liquid level in said inlet compartment, and
(5) eighth circuit means for energizing said second relay in response to a predetermined second liquid level in said inlet compartment, said eighth circuit means deenergizing said second relay in response to a predetermined third liquid level in said inlet compartment.

12. In a liquid filtering system, the combination of
(a) a liquid sump including inlet and outlet compartments;
(b) a liquid filter communicating said inlet compartment with said outlet compartment;
(c) filter cleaning means;
(d) make-up means for supplying liquid to the system;
(e) circuit means for energizing said filter cleaning and make-up means in response to liquid level conditions in said inlet and outlet compartments including;
(1) a first control line for said filter cleaning means having a liquid contact at a predetermined first level in said inlet compartment,
(2) a second control line for said filter cleaning means having a liquid contact at a predetermined liquid level in said outlet compartment, and
(3) a ground line connecting said first and second contact lines to liquid in said sump.

13. In the liquid filtering system as recited in claim 12, said circuit means including;
(a) a third control line for said make-up means connected to said ground line and having a liquid contact at a second predetermined level in said inlet compartment, and
(b) a fourth control line for said make-up means connected to said ground line and having a liquid contact spaced a predetermined distance from said third control line contact.

14. In a filtering system for removing foreign material from a liquid,
(a) a liquid receptacle having first and second sections;
(b) a member having a perforate peripheral surface;
(c) means rotatably mounting said member between said first and second receptacle sections, a portion of said member perforate surface communicating said first section with said second section;
(d) means for introducing liquid to be filtered in said first section;
(e) means for introducing make-up liquid in said first section;
(f) means for removing filtered liquid from said second section;
(g) means for cleaning said member;
(h) means for regulating said cleaning and make-up means including
(1) first control means responsive to a first predetermined liquid level in said first compartment for actuating said cleaning means,
(2) second control means responsive to a predetermined liquid level in said second compartment for actuating said cleaning means,
(3) third control means responsive to a second predetermined liquid level in said first compartment for actuating said make-up means, and
(4) fourth control means responsive to a third predetermined liquid level in said first compartment for deenergizing said make-up means.

15. In the filtering system as recited in claim 14, said regulating means including timing means operable to deenergize said cleaning means after a preset interval in response to deenergization of said first and second control means.

16. In the filtering system as recited in claim 15, said cleaning means including
(a) drive means adapted when actuated to rotate said member, and,
(b) liquid spray means spaced from said perforate surface and adapted when actuated to discharge liquid at said surface to remove foreign matter therefrom.

17. In the method of operating a liquid filtering system having a sump with inlet and outlet compartments and a filter communicating said inlet compartment with said outlet compartment, the steps which consist in:
(a) supplying liquid to be filtered to said inlet compartment,
(b) cleaning said filter in response to an increase in liquid level in said inlet compartment above a preset level,
(c) cleaning said filter in response to a decrease in liquid level in said outlet compartment below a preset level,
(d) continuing said filter cleaning operation for at least a predetermined time interval,
(e) adding liquid to said system in response to fall of the liquid to a first predetermined liquid level in said inlet compartment,
(f) terminating filter cleaning at the end of said timed interval upon an increase in liquid level in said outlet compartment above said preset level, and
(g) terminating the addition of liquid to said system in response to rise of the liquid to a second predetermined liquid level in said inlet compartment.

References Cited by the Examiner
UNITED STATES PATENTS

| | | | |
|---|---|---|---|
| 1,045,830 | 12/1912 | Gates | 210—107 X |
| 1,346,898 | 7/1920 | Kingsbury. | |
| 1,411,945 | 4/1922 | Wallene | 210—122 |
| 1,936,628 | 11/1933 | Knowles | 210—86 |
| 2,014,144 | 9/1935 | Mensing | 210—394 X |
| 2,092,623 | 9/1937 | Kuster | 210—106 |
| 2,758,722 | 8/1956 | Murray | 210—122 X |
| 2,924,335 | 2/1960 | Nickols | 210—104 X |
| 2,932,360 | 5/1960 | Hungate | 55—230 |
| 2,972,413 | 2/1961 | Loveless | 210—97 X |
| 3,012,677 | 12/1961 | Hungate | 210—107 |
| 3,119,887 | 1/1964 | Baehr | 261—36 |

REUBEN FRIEDMAN, *Primary Examiner.*
HERBERT L. MARTIN, *Examiner.*